United States Patent

Ray

[11] 3,888,517
[45] June 10, 1975

[54] TRAILER HITCHING COUPLER

[76] Inventor: James D. Ray, Rt. 5, Box 208, Nampa, Idaho 83651

[22] Filed: Nov. 16, 1973

[21] Appl. No.: 416,697

[52] U.S. Cl. .............................................. 280/512
[51] Int. Cl............................................... B60d 1/06
[58] Field of Search ........................... 280/512, 511

[56] References Cited
UNITED STATES PATENTS

| | | | |
|---|---|---|---|
| 2,439,967 | 4/1948 | Dollase | 280/512 |
| 2,693,970 | 11/1954 | Coleman | 280/512 |
| 3,009,714 | 11/1961 | Lamberson | 280/512 |
| 3,446,520 | 5/1969 | Gibson | 280/512 |

*Primary Examiner*—Robert R. Song

[57] ABSTRACT

The trailer hitching coupler comprises a body having a dome being engageable with a hitching ball from below and having an entranceway in its rearward side, a pair of upstanding opposedd supporting side walls issuing from the rearwardmost terminal side of the dome, and a body issuing sidewardly in the manner of a flange from the lowermost terminal edges of the dome and sidewalls, and a top wall being coextensive with and being fastened to the uppermost terminal edges of the support walls; and a shoe assembly including a shoe being journally mounted on a transversely disposed shaft fastened between the support walls distally rearward of, and disposable through, the entranceway of the dome to contact the hitch and having a concavely curved portion on the upper side of its forwardmost terminal end to mate with a hitching ball, a shoe aligning tab issuing from the shoe through a slot in the top wall for pivoting the shoe away from or adjacent to the hitching ball, and a knife-lock sub-assembly having a spring loaded knife-lock to engage a notch in the rearwardmost terminal end of the shoe to retain the shoe adjacent the hitching ball.

2 Claims, 3 Drawing Figures

PATENTED JUN 10 1975　　　　　　　　　　　　　3,888,517
FIG. 1
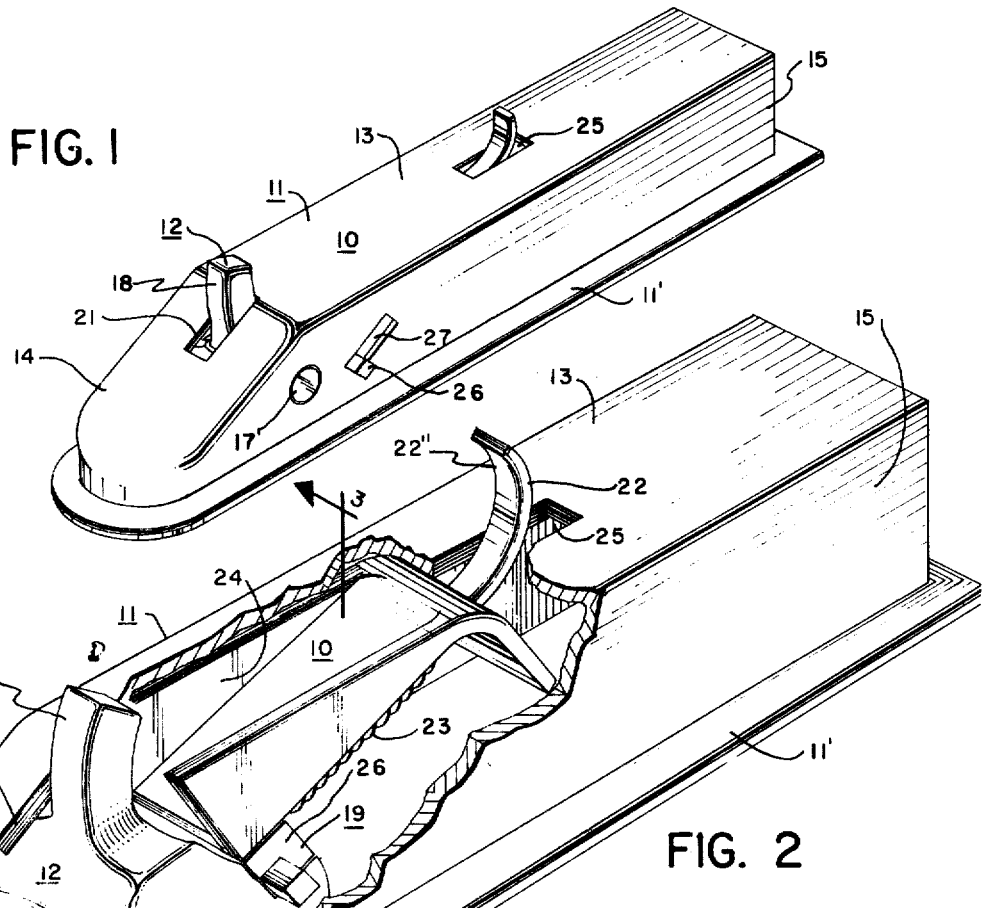
FIG. 2
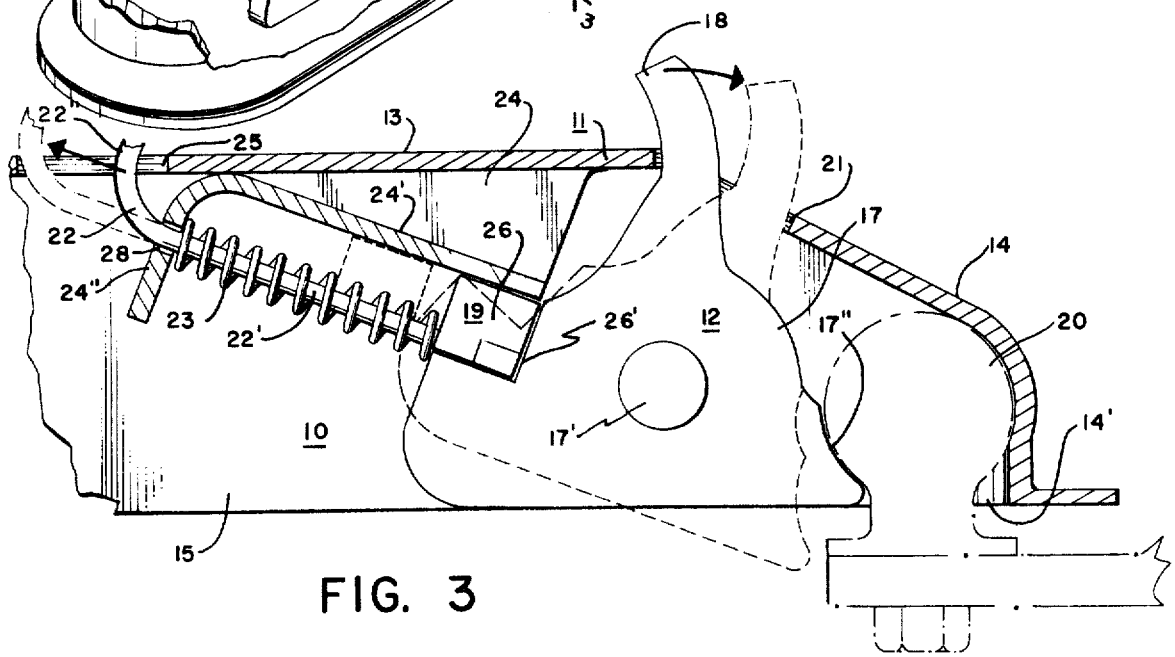
FIG. 3

TRAILER HITCHING COUPLER

FIELD OF INVENTION

The present invention relates to trailer hitching couplers, and more particularly to trailer hitching couplers operable to be secured to a hitching ball by a pivotal shoe locked by a retractable knife-lock.

DESCRIPTION OF THE PRIOR ART

Means operable to lock trailer couplers to trailer hitching balls have commonly used and employed locking jaws and auxiliary chains. Locking jaws commonly are actuated by other means or by threaded crank-like actuators. Locking jaws engage the hitching ball about its lower portions in a vise-like manner. Vibration and high impact forces tend to separate the jaws, thus resulting in uncoupling of the trailer, coupler and hitching ball. Auxiliary locking means, such as chains, are commonly fastened to a towing vehicle. Chains must be fastened to the towing vehicle as a separate step from trailer hitching, and should be secured to suitably stressed chassis members which are commonly not easily accessible. Auxiliary chains may result in strict pivoting of the coupler on the ball.

Accordingly, it is an object of the present invention to provide trailer coupler means which are operable to locking engage with a hitching ball by means of a positively locked pivotal shoe. It should be pointed out that typical of improved apparatus also accomplishing this object is U.S. Letters Pat. No. 3,730,559 issued May 1, 1973 to James D. Ray, the inventor herein.

It is another object of this invention to provide a trailer coupler locking means which must be engaged to prevent hitching of the trailer coupler to a hitching ball.

These and other objects shall become apparent from the description following, it being understood that modifications may be made without affecting the teachings of the invention here set out.

SUMMARY OF THE INVENTION

The trailer hitching coupler comprises a body having a dome being engageable with a hitching ball from below and having an entranceway in its rearward side, a pair of upstanding opposing supporting side walls issuing from the rearwardmost terminal side of the dome, and a body issuing sidewardly in the manner of a flange from the lowermost terminal edges of the dome and sidewalls, and a top wall being coextensive with and being fastened to the uppermost terminal edges of the support walls; and a shoe assembly including a shoe being journally mounted on a transversely disposed shaft fastened beteen the support walls distally rearward of, and disposable through, the entranceway of the dome to the upper side of its forwardmost terminal end to mate with a hitching ball, a shoe aligning tab issuing from the shoe through a slot in the top wall for pivoting the shoe away from or adjacent to the hitching ball, and a knife-lock sub-assembly having a spring loaded knife-lock to engage a notch in the rearwardmost terminal end of the shoe to retain the shoe adjacent the hitching ball.

A more thorough and comprehensive understanding may be had from the detailed description of the preferred embodiment when read in connection with the drawings forming a part of this specification.

BRIEF DESCRIPTION OF THE DRAWINGS

FIG. 1 is a left front perspective view of the trailer coupler of this invention.

FIG. 2 is a left front perspective view of the apparatus of the FIG. 1 drawn to larger scale and having walls of the coupling housing broken away to show the interior configuration thereof.

FIG. 3 is a cross-sectional view taken substantially along the line 3—3 of the FIG. 2 showing interior configuration thereof.

DETAILED DESCRIPTION OF THE PREFERRED EMBODIMENT

Referring now to the drawings and more particularly to the FIG. 1, the trailer hitching coupler of this invention is shown to advantage and generally identified by the numeral 10. The coupler 10 comprises a body 11 and a shoe assembly 12. The body 11 comprises a top plate or wall 13, a coupler dome 14, and a pair of sidewalls 15. The body 11 is provided with a horizontally disposed flange-like plate portion 11' disposed about the lowermost terminal edge of the dome 14 and walls 15. The coupler dome 14 is a domed portion issuing from the uppermost terminal side of the body 11. The arcuate interior configuration of the dome 14 is distally larger than the outside configuration of a trailer hitching ball as shown more clearly in the FIG. 3. A ball receiving entranceway 14' is provided in the body 11, under the interior of the dome 14, is shown in the FIGS. 2 and 3. Referring again to the FIGS. 1 and 2, a pair of parallelly disposed upstanding walls 15 issue rectilinearly from the uppermost terminal side of the body 11 between the rearwardmost terminal side of the dome 14 and the rearwardmost terminal end of the coupler 10. A top wall 13 coextensively connects the walls 15. It may be seen that the flange plate 11' of the body 11 provides means for fastening the coupler 10 to a trailer tongue (not shown). It is also to be understood that the walls 15 and top plate 13 provide a housing for the assembly 12 and rectilinear support for the coupler 10.

Referring to the FIGS. 2 and 3, a shoe assembly 12 comprises a shoe 17, a shoe-aligning tab 18, and a knife-lock sub-assembly 19. The shoe 17 is generally mounted by an axle 17' fastened in the forward portions of the supporting walls 15, distally from the dome 14. The forward lower portion 17" of the shoe 17 has a curved configuration similar to the outer arcuate configuration of a hitching ball 20. The dome 14 is provided at its rearwardmost terminal end with an entranceway 14" operable to receive the forward portions of the shoe 17 and to guide the forward portion of the shoe 17 with the ball 20. The shoe-aligning tab 18 is fastened to the uppermost terminal side of the shoe 17, and issues through a slot 21 in the top wall 13 distally rearward of the dome 14. The tab 18 is employed to pivot the forwardmost portion of the shoe 17 downwardly to permit the ball 20 to enter the dome 14, and then to pivot the forward portion of the shoe 17 adjacent the ball 20 to be locked by the sub-assembly 19.

The knife-lock sub-assembly 19 comprises an L-shaped handle 22, an operating urging spring 23 and a guide web 24. The handle 22 is disposed rectilinearly between the walls 15 with its longest portion 22' disposed at a downwardly inclined angle from the rearward to forward and to the coupler 10, and with its shorter, perpendicular portion 22" issuing upwardly through a slot 25 distally from the rearwardmost terminal end of the top wall 13. The portion 22'' may curve forwardly to provide a convenient finger-like grip. The forwardmost terminal end of the longer handle portion 22' is provided with a blade 26 which is disposed transversely of the coupler 10 in slots 27 disposed angularly in the sidewalls 15. The forward, lower terminal, edge of the blade 26 is operable to engage a notch 26 cut in the rearwardmost terminal side of the shoe 17, when the shoe 17 is in its ball-engaging position. It may be seen that the coupler 10 may be conveniently stiffened by providing a floor-like portion of the plate 11' below the rearward portion of the shoe 17 against which the lowermost terminal side of the shoe 17 may rest when the ball 20 is being locked by the shoe 17. Alternatively, the rearwardmost terminal end of the slot 21 may engage the rearwardmost terminal side of the tab 18 when the shoe 17 is engaged with the ball 20. The web 24 may be an L-shaped member fastened with its longest portion 24' issuing downwardly from a point distally forward of the slot 26, and its shorter portion 24'' issuing perpendicularly to the longer portion 24', the intersection of the longer and shorter portions 24' and 24'' of the web 24 being fastened to the lowermost terminal side of the top wall 13 distally forward of the slot 25. The shorter portion 24'' of the web 24 is provided with a hole 28 through which the handle 22 may slide. The operating spring 23 is disposed between the forwardmost terminal side of the shorter portion 24'' of the web 24 and the rearwardmost terminal side of the blade 26. It may be seen that it is convenient to dispose the forwardmost terminal edge of the longer portion of the web 24 in a position which may permit the shoe 17 to pivot sufficiently to permit passage of the ball 20.

In operation, the coupler 10 may be prepared for receiving a hitching ball 20 by retracting the handle 22 sufficiently to permit the shoe 17 to be pivoted downwardly by the tab 18. The ball 20 may be disposed into the dome 14, and the shoe 17 may be rotated by means of a tab 18 adjacent the ball 20. The handle 17 may then be released to engage the notch 26'. It may be seen that, when the coupler 10 is not engaged to a ball 20, the coupler 10 may be pivoted downwardly and retained in that position by compressive force applied by the blade 26 urged by the operating spring 23.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A trailer hitching coupler, comprising:

a body having a dome being engageable with a hitching ball from below and having a pair of parallelly disposed support walls fastened to the rearwardmost terminal side of said dome, and a top wall being coextensive with and being fastened to the uppermost terminal edges of said support walls and to said dome; and a shoe assembly including a shoe being mounted on an axle fastened transversely between said support walls distally rearward of said dome, said shoe having a concave curved portion on the upper side of its forwardmost terminal end to mate with the lower curvature of said hitching ball, said dome having an entranceway in its rearwardmost terminal side to permit the forwardmost terminal side of said shoe to project through said dome adjacent said ball, a shoe-aligning tab issuing from the uppermost terminal side of said shoe engageable through a slot in said top wall for pivoting said shoe away from or adjacent to said hitching ball, and a knife-lock sub-assembly having a spring loaded knife-lock engageable with a notch in the rearwardmost terminal end of said shoe to retain said shoe adjacent said hitching ball, said knife-lock being provided on a handle which projects through a second slot in said top wall rearwardly of said slot carrying said tab and being guided by means provided in said body, said knife-lock sub-assembly comprises a substantially L-shaped handle carried rectilinearly in and being guided by a web member fastened to said support walls, a blade fastened transversely to the forwardmost terminal end of said handle to engage said shoe notch, said blade being carried at its terminal sides in slots disposed in said support walls, and a spring disposed about said handle between said blade and said web member to urge said blade and handle adjacent said knife-lock.

2. The apparatus of claim 1 wherein the lower terminal edges of said dome and said support walls are provided with a body plate which issues sidewardly in the manner of a flange.

* * * * *